United States Patent Office 2,766,228
Patented Oct. 9, 1956

2,766,228

BIS-SULFONYLTRIAZENES

William Baptist Hardy and Frederic Henry Adams, Bound Brook, N. J., assignors to American Cyanamid Company, New York, N. Y., a corporation of Maine No Drawing. Application December 14, 1954,
Serial No. 475,285

6 Claims. (Cl. 260—140)

This invention relates to a new class of compounds. More particularly, it relates to bis-sulfonyltriazenes of the formula

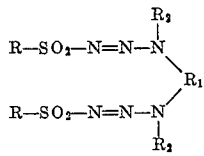

in which R is an organic radical such, for instance, as aliphatic, aralkyl, aryl, heterocyclic and the like, which may be substituted; $R_1$ is a diarylene radical or lower alkyl- or alkoxy-substituted diarylene radical in which the nuclei may be interposed by an oxygen or sulfur atom; and $R_2$ is an aliphatic radical linked through a saturated carbon atom to the nitrogen such as alkyl, alkenyl, aralkyl and the like which may be substituted.

The new compounds, in accordance with this invention, are useful in the fields of pharmaceuticals, dyes, rubber processing and the like. Specifically, it has been found that these compounds are particularly useful as blowing agents in the preparation of cellular rubber and plastic materials.

In preparation of the new sulfonyltriazenes, a tetrazonium salt can be reacted with a stoichiometrically equivalent amount of a selected sulfonamide to form the intermediate tetrazosulfonamide. The intermediate can then be alkylated using a lower dialkyl sulfate such as dimethyl- or diethylsulfate. The N-substitution may also be accomplished in a manner other than by direct alkylation. Where, for instance, the substituent is to be a cyanoalkyl, the tetrazosulfonamide may be reacted with an acrylonitrile. This latter procedure forms the subject matter of copending application for U. S. Letters Patent, Serial No. 475,283, of the applicants herein, filed of even date.

The tetrazo compounds employed in the preparation of the intermediate product are preferably salts of 4,4'-diamino-diarylene in which the nuclei of the diarylene radical may or may not be interposed by an oxygen or sulfur atom. For example, there may be employed salts of 4,4'-diamino-diphenyl, 4,4'-diamino-diphenyl ether, 4,4'-diamino-diphenyl sulfide, 4,4'-diamino-3,3'-dimethoxy-diphenyl, 4,4'-diamino-3,3'-dimethyl-diphenyl, 4,4'-diamino-1,1'-dinaphthyl and the like.

The monosulfonamide with which the tetrazo compound is coupled to form the intermediate tetrazo sulfonamide may be widely varied. Examples of such sulfonamides include, for instance, cycloalkylsulfonamides, such as cyclohexane sulfonamide; aralkylsulfonamides such as phenylmethanesulfonamide, phenylethanesulfonamide, and 2-, 3- and 4-nitrophenylmethanesulfonamides; arylsulfonamides such as benzenesulfonamide, o-, m- and p-ethylbenzenesulfonamide, o-, m- and p-chlorobenzenesulfonamides, o-, m- and p-methoxybenzenesulfonamides, o-, m- and p-methylbenzenesulfonamides, o-xylene-2, 3-, 4- and 5-, sulfonamides, biphenyl-4-sulfonamide, 1- and 2-naphthalenesulfonamides, 1-nitro- 3-, 4-, 5-, 6-, 7-, and 8-naphthalene sulfonamides, 1-acetoxynaphthalene-6-sulfonamide, 2-chloronaphthalene-6-sulfonamide, anthracene-1- and 2-sulfonamides, phenanthrene-2,3- and 9- sulfonamides, and acenaphthene-3-sulfonamide; and heterocyclic sulfonamides such as 3-pyridine-sulfonamide, quinoline-5-sulfonamide, isoquinoline 5- and 8-sulfonamide, benzimidazole-5-sulfonamide, 2 - acetoxycarbazole-7-sulfonamide, 1,2-benzocarbazole-3-sulfonamide, dibenzofuran-2-sulfonamide, 2 - acetamidothiazole-5-sulfonamide, and the like.

The intermediate tetrazoamide compounds so obtained are then treated to obtain N-substituted sulfonyltriazenes of this invention. The $R_2$ residue so obtained is an aliphatic radical linked through a saturated carbon atom to the nitrogen. As examples, there might be mentioned lower alkyl radicals such as methyl, ethyl, propyl, butyl and the like and chloro-derivatives thereof; alkenyl radicals such as allyl, acrylonitrile, methacrylonitrile, crotononitrile, β-ethylacrylonitrile, β-isopropylacrylonitrile, β-isobutylacrylonitrile and the like; aralkyl radicals such as benzyl and phenylethyl and the like.

The invention is further illustrated by the following examples which are not intended to be limiting. Unless otherwise noted, all parts are by weight.

EXAMPLE 1

*3,3'-(4,4'-biphenyl)-bis-[3-methyl-1-benzenesulfonyltriazene]*

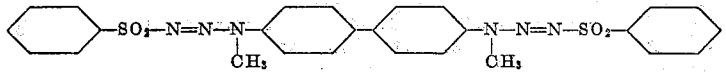

To 125 parts of water mixed with 107 parts of 37.5% hydrochloric acid is added 27.6 parts of 4,4'-diaminodiphenyl followed by cooling to about 5° C. and the addition of 60 parts by volume of 5 N sodium nitrite. After tetrazotization is complete, the solution of tetrazo is filtered through charcoal and added to a cold solution of 48 parts of benzenesulfonamide in a mixture of 2000 parts water and 122 parts of 50% sodium hydroxide solution. Ice is added as necessary to keep the solution cold. After the reaction is complete, 80 parts of dimethylsulfate is added gradually. The product is isolated by filtration, washed with water and dried.

EXAMPLE 2

*3,3'-[4,4'-(3,3'-dimethyl-biphenyl)]-bis-(3-methyl-1-benzenesulfonyltriazene)*

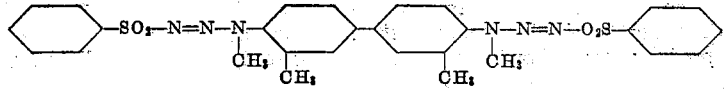

To 125 parts of water mixed with 107 parts of 37.5% hydrochloric acid is added 31.8 parts of 4,4'-diamino-3,3'-dimethyl-biphenyl. After cooling with ice, to about 5° C., 60 parts by volume of 5 N sodium nitrite solution is added. After tetrazotization is complete, the tetrazo solution is clarified by filtration with animal charcoal and added to a cold solution of 48 parts of benzenesulfonamide in a mixture of 2000 parts of water and 122 parts of 50% sodium hydroxide solution. The solution is kept cold by addition of ice as necessary. After the reaction with the tetrazo compound is complete, 80 parts of dimethyl sulfate is gradually added. The product which separates, 3,3'-[4,4'-(3,3'-dimethyl-biphenyl)] - bis-(3-methyl-1-benzenesulfonyltriazene), is isolated by filtration, washed with water and dried.

EXAMPLE 3

3,3' - [4,4' - (3,3' - dimethoxy - biphenyl)] - bis - (3 - methyl - 1 - benzenesulfonyl-triazene

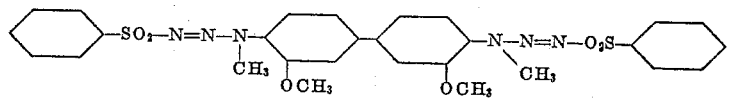

The procedure of Example 2 is repeated except that 36.6 parts of 4,4'-diamino-3,3'-dimethoxybiphenyl is used in place of 31.8 parts of 4,4'-diamino-3,3'-dimethylbiphenyl.

EXAMPLE 4

3,3' - [4,4' - (1,1' - binaphthyl)] - bis - (3 - methyl-1-benzenesulfonyltriazene)

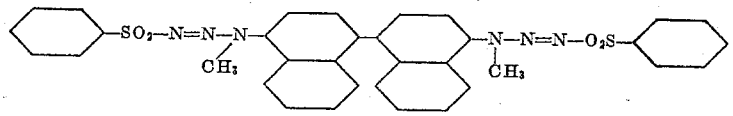

To solution of 107 parts of 37% hydrochloric acid in 125 parts of water is added, with stirring, 42.5 parts of 4,4'-diamino-1,1'-binaphthyl. After cooling with ice to 5° C., 60 parts by volume of 5 N sodium nitrite solution is added. The mixture is stirred until tetrazotization is complete, the solution filtered and added to a cold solution of 48 parts of benzenesulfonamide in a mixture of 2000 parts of water and 122 parts of 50% sodium hydroxide solution. The solution is kept at a low temperature by occasional addition of ice. 80 parts of dimethyl sulfate is gradually added and stirring continued until the reaction is substantially complete. The product which separates, 3,3' - (4,4' - 1,1' - binaphthyl) - bis - (3-methyl - 1 - benzenesulfonyltriazine), is isolated by filtration, washed with water and dried.

EXAMPLE 5

3,3' - (4,4' - diphenyl ether) - bis - (3 - methyl - 1 - benzenesulfonyltriazine)

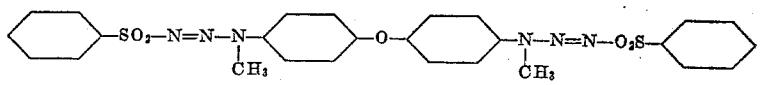

The procedure of Example 4 is repeated except that 30 parts of 4,4'-diamino-diphenyl ether is used in place of 42.5 parts of 4,4'-diamino-1,1'-binaphthyl.

To illustrate the use of the new compounds of this invention as blowing agents in the formation of cellular products, the following example was conducted.

EXAMPLE 6

A rubber stock containing the compound of Example 1 was prepared according to the following composition:

| Compound: | Parts |
|---|---|
| Plasticized rubber | 100 |
| Stearic acid | 2 |
| Zinc oxide | 5 |
| Keystone whiting | 50 |
| Unitane O-220 | 15 |
| Light process aid | 10 |
| Petrolatum | 3 |
| 2,2' - methylene - bis - (4 - methyl - 6 - t-butyl phenol) | 0.5 |
| Sulfur | 3 |
| Bis-benzothiazole disulfide | 0.6 |
| Di-o-tolyl guanidine | 0.15 |
| 3,3' - (4,4' - biphenyl) - bis - 3 - methyl - 1 - sulfonyl triazene | 1.5 |

Samples of the stock were blown at 153° C. for 35 minutes and 130° C. for 60 minutes. The mold size was 6 cubic inches and both high and low loads were blown. In the case of white stock, the respective portions for high and low loads are 51 grams and 42 grams. For neutral colored stock they are 48.5 grams and 40 grams. In each instance, a completely blown, substantially colorless product of uniform, fine cell structure was obtained.

We claim:

1. Bis-sulfontriazenes of the formula

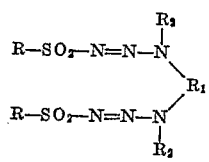

in which R is an aryl radical of the benzene and naphthalene series; $R_1$ is selected from the group consisting of diarylene, oxybisarylene and thiobisarylene radicals; and $R_2$ is a lower aliphatic radical of 1-4 carbon atoms linked through a saturated carbon to the nitrogen.

2. 3,3' - (4,4' - biphenyl) - bis - [3 - methyl - 1 - benzenesulfonyl - triazene] of the formula

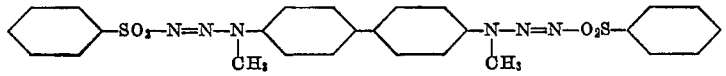

3. 3,3' - [4,4' - (3,3' - dimethyl - diphenyl)] - bis - (3-methyl - 1 - benzenesulfonyltriazene) of the formula

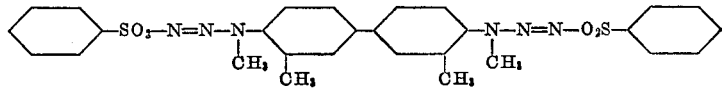

4. 3,3' - [4,4' - (3,3' - dimethoxy - biphenyl)] - bis - (3-methyl - 1 - benzenesulfonyltriazene) of the formula

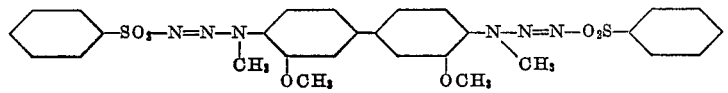

5. 3,3' - [4,4' - (1,1' - binaphthyl)] - bis - (3 - methyl-1 - benezenesulfonyltriazene) of the formula

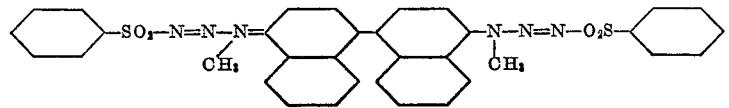

6. 3,3' - (4,4' - diphenyl ether) - bis - (3 - methyl - 1-benzenesulfonyltriazene) of the formula

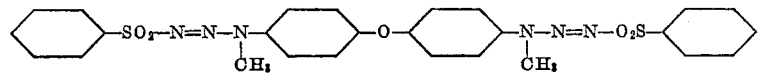

References Cited in the file of this patent
UNITED STATES PATENTS

| | | |
|---|---|---|
| 2,117,251 | Kleiderer et al. | May 10, 1938 |
| 2,402,611 | Dickey et al. | June 25, 1946 |